(12) United States Patent
Gatto (10) Patent No.: US 6,552,828 B1
(45) Date of Patent: Apr. 22, 2003

(54) PRECISION DEEP INPUT GUIDE CLIP FOR DOCUMENT SCANNERS AND DOCUMENT SCANNER INCORPORATING SAME

(75) Inventor: Jean-Marie Gatto, London (GB)

(73) Assignee: Cyberscan Technology, Inc., Palo Alto, CA (US)

( * ) Notice: Subject to any disclaimer, the term of this patent is extended or adjusted under 35 U.S.C. 154(b) by 0 days.

(21) Appl. No.: 09/340,230

(22) Filed: Jul. 1, 1999

(51) Int. Cl.[7] .............................. H04N 1/04; H04N 1/40
(52) U.S. Cl. .................. 358/496; 358/487; 358/475; 358/474; 358/482; 358/471; 358/483
(58) Field of Search ................ 358/496, 487, 358/475, 474, 482, 471, 483

(56) References Cited

U.S. PATENT DOCUMENTS

| | | | | |
|---|---|---|---|---|
| 4,977,313 A | * | 12/1990 | Nagata et al. ............... | 250/208 |
| 5,468,943 A | * | 11/1995 | Gatto et al. .................. | 235/454 |
| 5,673,125 A | * | 9/1997 | Merecki et al. ............. | 358/487 |
| 5,844,697 A | * | 12/1998 | Omvik et al. ................ | 358/487 |
| 5,847,948 A | * | 12/1998 | Gatto et al. .................. | 363/65 |
| 5,966,221 A | * | 10/1999 | Tellam et al. ................ | 358/475 |
| 6,034,784 A | * | 3/2000 | Gatto et al. ................. | 358/1.18 |
| 6,128,105 A | * | 10/2000 | Ishikawa et al. ............ | 358/483 |
| 6,268,938 B1 | * | 7/2001 | Lee ............................. | 358/498 |

* cited by examiner

Primary Examiner—Edward Coles
Assistant Examiner—Houshang Safaipour
(74) Attorney, Agent, or Firm—Young Law Firm, P.C.

(57) ABSTRACT

A document-guiding device that clips onto the image sensor of a document scanner ensures that documents to be scanned are introduced into the scanner at an optimal angle and are applied to the transparent surface of the image sensor at an optimal pressure, thereby avoiding scratching and soiling the sensor glass surface. Moreover, the deep input guide clip includes a sharp edge that acts as a scrapper to remove or flatten protruding impurities to further reduce soiling the sensor transparent surface. The deep input guide clip has the added benefit of stopping parasitic ambient light and protecting the image sensor against hard falling objects thus avoiding breakage of the transparent surface. The deep input guide clip forms a compact enclosure that may also hold a set of document proximity sensors and associated control electronics for precisely detecting the leading edge of the document when it is introduced in the scanner, its width and its trailing edge.

34 Claims, 7 Drawing Sheets

PRECISION DEEP INPUT GUIDE CLIP FOR DOCUMENT SCANNERS AND DOCUMENT SCANNER INCORPORATING SAME

BACKGROUND OF THE INVENTION

1. Field of the Invention

The present invention pertains to the field of document scanner computer peripherals. In particular, the present invention is drawn to precision deep input guide clips that guide the document over the image sensor at an optimal angle and at an optimal pressure, and to document scanners using the same.

2. Description of the Related Art

Document scanners are computer peripherals that allow users to scan documents into their computers for later storage, retrieval and/or manipulation. Although document scanners are extremely useful peripherals, they have not yet attained the ubiquity of other common peripherals, such as CD-ROM or DVD drives, printers, modems or multimedia sound cards, for example. This state of affairs persists despite the fact that prices for document scanners for personal computers are low and continue to decline rapidly. It does not appear, therefore, that price constitutes a significant barrier to entry for consumers seeking to upgrade the functionality of their personal computers and for manufacturers seeking to integrate scanners into their own products. Instead, it is believed that document scanners have not, to date, realized their anticipated success due to a combination of shortcomings including lack of integration, poor reliability, difficulty of use and slow speed.

Several types of scanners exist, each type being specifically designed for a particular purpose: monochrome, color, sheet-fed, flatbed, handheld, photo-print, photo-slide, SCSI host interface, printer port host interface, IEEE1284 parallel port host interface, serial port host interface, USB host interface, IEEE1394 FireWire host interface, etc. Development costs and time to market are therefore significant. Only scanner manufacturers that are fully committed to document scanner products can afford to be involved in document scanner developments. Manufacturers that wish to incorporate document scanner functions into other types of equipment (multifunction terminals, consumer appliances, gaming devices for example) in order to differentiate their products from those of the competition have experienced difficulties in meeting their goal.

Figure 1:
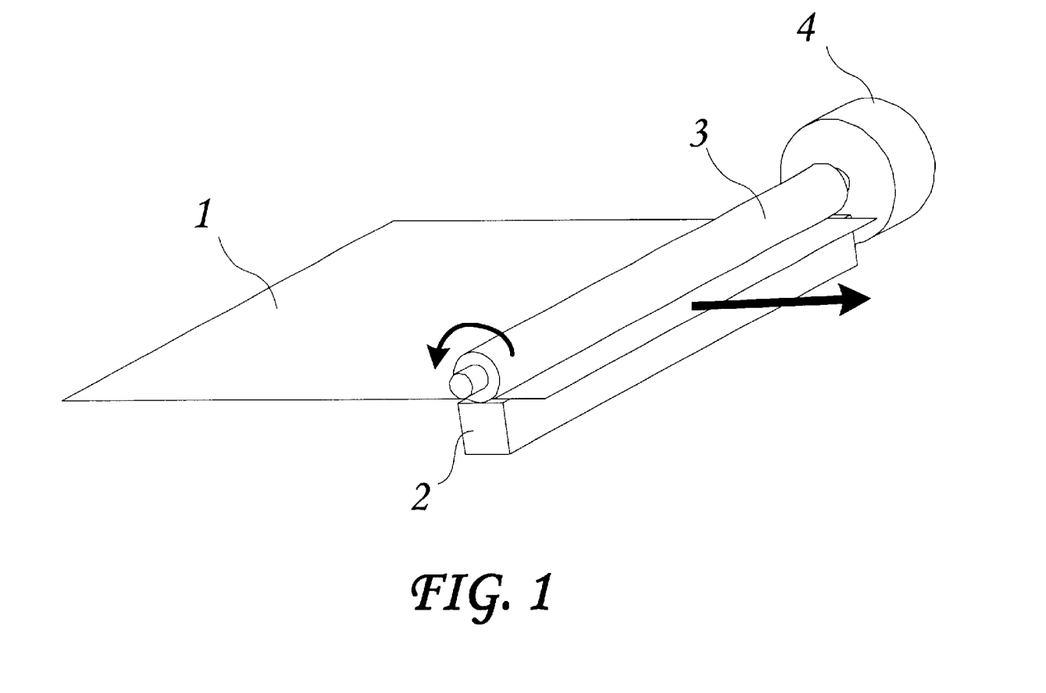
FIG. 1 is a perspective view of the major mechanical elements of a sheet-fed scanner. The electronics circuits that control the scanner and the communication link with the host computer are not represented.

FIG. 1 shows a typical arrangement for a sheet-fed document scanner. In FIG. 1, a document 1 is displaced by a rotating roller paper feeding mechanism 3 driven by a motor 4 over a fixed image sensor 2 that senses reflected light from the document 1. Alternatively, the paper feeding mechanism may be a belt, a plurality of rollers or a combination of one or more rollers and belts. Illumination is provided from the image sensor 2. The image sensor 2, together with its associated electronics (not shown), records a line of information at a time. When the document 1 is driven by the motor 4 and the roller 3, the image sensor 2 records the entire document area swept. The scanner control electronics and the communication link with the host computer are not shown, for clarity.

Figure 2:
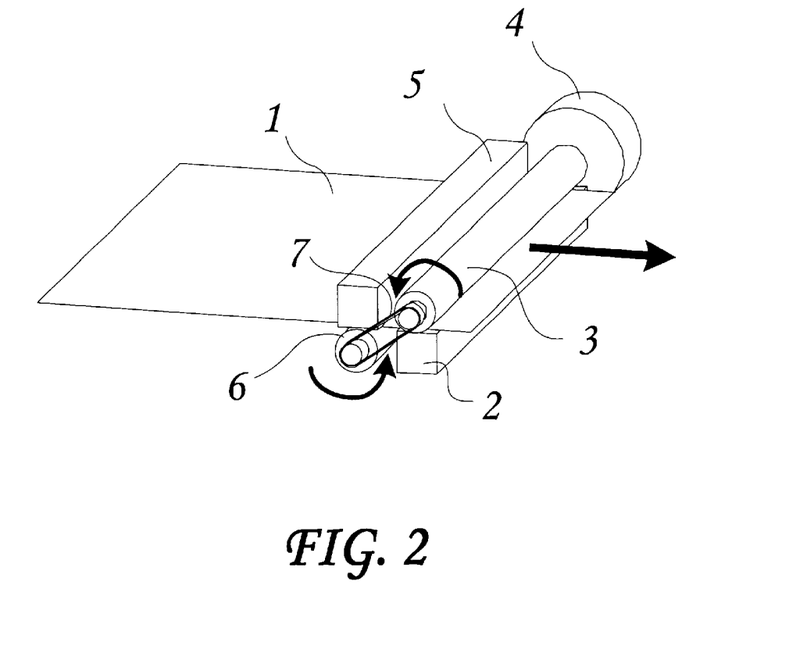
FIG. 2 is a perspective view of the major mechanical elements of a duplex scanner. The electronics circuits that control the scanner and the communication link with the host computer are not represented.

FIG. 2 shows a typical arrangement for a duplex document scanner. In FIG. 2, a document 1 is displaced by two rotating rollers 3 and 6 driven by a motor 4 over two fixed image sensors 2 and 5 that sense reflected light from each side of the document. Alternatively, the paper feeding mechanism may be a plurality of belts (one shown at reference numeral 7 in FIG. 2), or a plurality of rollers and belts. Illumination is provided from each image sensor 2, 5. The image sensors 2, 5, together with their associated electronics (not shown), record a line of information for each side of the document 1. When the document 1 is driven by the motor 4 and the rollers 3, 6, the image sensors 2, 5, together with their associated electronics, record the entire area swept of the document 1 on both sides thereof. The scanner control electronics and the communication link with the host computer are not shown in FIG. 2.

The image sensors used in sheet-fed and duplex scanners, for example, may be charge-coupled devices (CCD), monochrome or color sensors having a width of approximately 40 to 60 mm fitted with a suitable optical apparatus to reduce the image of the document and an illumination source or monochrome or color contact image sensors (CIS). These image sensors are usually available in B6, A4, A3 sizes or approximately 100 mm to 300 mm. The image sensors produce an analog signal that is commonly called a video signal. Illumination for sheet-fed and other types of scanners (e.g., flatbed scanners, slides scanners) and duplex scanners may be produced using light emitting diodes (LED), cold cathode fluorescent light (CCFL) tubes, electro-luminescent screens or filament lamps, for example. Color dropout (the elimination of a color) may be produced by using color filters that block a selected wavelength or by selecting light sources that generate the selected wavelength.

In both of the scanners shown in FIGS. 1 and 2, however, the document 1 is dragged across the surface of the glass covering the image sensors 2, 5. The document 1, however, may be soiled, and have abrasive particles clinging thereto. The document 1 moreover, even though apparently unsoiled, may itself contain abrasive impurities therein. In addition, the ink used on the document 1 may not be fully dry and may leave an oily residue on the image sensor transparent (typically glass) surface. These abrasive particles, impurities and residues may, with repeated usage, scratch and obscure the surface of the glass covering the image sensors 2, 5, thereby degrading the quality of the resulting scanned image. This scratching may be further exacerbated by the roller 3, 6 pressing the document 1 against the glass of the image sensors 2, 5 with too great a pressure. The quality of the scanned images may also suffer from the effects of parasitic ambient light impinging upon the image sensors 2, 5. Such ambient light may reach the sensors 2, 5 as the sensors 2, 5 are not protected therefrom, particularly when the leading edge of the document 1 is dragged across the sensors 2, 5.

What are needed, therefore, are improved scanners that do not suffer from the forementioned disadvantages. Specifically, what are needed are document scanners with improved resistance to such soiling, scratching or obscuring of the image sensor glass. What are also needed are document scanners and associated document feeding mechanism that eliminate or reduce the amount of parasitic ambient light that is allowed to reach the scanner sensors.

SUMMARY OF THE INVENTION

An object of the present invention, therefore, is to provide document scanners that are resistant to such soiling, scratching or obscuring of the sensor glass or other corresponding transparent surface. It is another object of the present invention to provide a document scanner having an improved document feeding mechanism that introduces the document into the scanner at an optimal angle and at an optimal pressure to eliminate or reduce the glass scratching problems often associated with conventional document scanners, even when subjected to heavy usage patterns. Such a document scanner should also protect the image sensors from parasitic ambient light, thereby resulting in an improved scanned image quality.

In accordance with the above-described objects and those that will be mentioned and will become apparent below, a document scanner, according to an embodiment of the present invention, comprises:

an image sensor, the image sensor including a transparent surface over an optical focus line;

a feed roller motor;

a rotatable feed roller coupled to the feed roller motor, the feed roller being adapted to contact said transparent surface along a contact line that is offset from said optical focus line; and a generally U-shaped deep input guide clip, the deep input guide clip including a plurality of retaining bends to clip onto the image sensor and including a document facing surface defining an opening aligned with the transparent surface, the retaining bends precisely locating the optical focus line relative to the contact line.

According to further embodiments, the deep input guide clip may be shaped from a single sheet of material, such as plastic or sheet metal. The generally U-shaped deep input guide clip may include a pair of facing arms extending from a closed portion of the U-shape, the pair of facing arms being resiliently biased toward one another. The deep input guide clip may include a plurality of spaced cutouts adapted to trap dust as a document is introduced into the scanner. A plurality of document proximity sensors may also be included to detect the leading edge, width and trailing edge of the document introduced into the scanner, the proximity sensors being secured within the deep input guide clip. The proximity sensors may be secured within the deep input guide clip by selected ones of the retaining bends and by proximity sensor folds integral to the deep input guide clip, an active portion of each of the plurality of document proximity sensors being aligned with a corresponding one of the plurality of spaced cutouts. An edge of the document facing surface may be disposed so as to scrape the document as it is introduced into the scanner. The optical focus line may be disposed between the edge of the document facing surface and the contact line, the pressure on the document during a scanning operation being greater at the contact line than at the optical focus line. A primary input guide may be provided, including a generally planar first surface angled relative to the document facing surface, and a generally arcuate second surface facing the feed roller in close proximity therewith and having a curvature generally matching that of the feed roller. In this manner, the primary input guide constrains a path of the document between the first surface and the document facing surface and prevents the feed roller from catching the document until the document is deeply engaged within the scanner. The image sensor may include a contact image sensor and the plurality of document proximity sensors may include infrared sensors.

The present invention may also be viewed as a one-piece deep input guide clip to secure an image sensor of a document scanner, the guide clip including a closed portion from which a pair of facing arms extend, the facing arms being resiliently biased toward one another and including a plurality of retaining bends to clip onto and precisely locate at least an image sensor between the pair of facing arms, the guide clip further including a document facing surface, the document facing surface defining a plurality of cutouts adapted to trap dust and to provide openings for document proximity sensors.

According to still further embodiments, the document facing surface further defines a transparent surface opening to accommodate a transparent surface of the image sensor. The deep input guide clip may be formed of either plastic or sheet metal. The closed portion may define at least one proximity sensor fold extending between the facing arms to secure, in combination with at least one of the plurality of retaining bends, a document proximity sensor assembly. Each of the plurality of retaining bends may be formed, for example, by cutting out three sides of a rectangular window in one arm of the pair of facing arms and pushing a remaining portion of the window toward the other arm of the pair of facing arms. A first retaining bend of the plurality of retaining bends may be located at the free extremity of one of the facing arms and may form a continuous rail along a width thereof, the rail being configured to clip onto the image sensor. One or more second retaining bends of the plurality of retaining bends may be shaped as. a slender extension bent at a free extremity thereof to clip onto the image sensor.

A document scanner, according to another embodiment of the present invention, comprises:

image sensing means, the image sensing means including a transparent surface over an optical focus line;

feed roller motor means;

a rotatable roller means coupled to the feed roller motor means, the feed roller means being adapted to contact said transparent surface along a contact line that is offset from said optical focus line; and deep input guide clip means, the deep input guide clip means including means for precisely locating the optical focus line relative to the contact line such that a pressure on a document during a scanning operation is greater at the contact line than at the optical focus line.

According to further embodiments, the pressure on the document at the optical focus line may be substantially null. The deep input guide clip means may include a plurality of integral retaining bend means to clip onto the image sensor means, and may include a document facing surface defining an opening aligned with the transparent surface, the integral retaining bend means precisely locating the optical focus line relative to the contact line. The deep input guide clip means may be shaped from a single sheet of material, such as plastic or sheet metal. The deep input guide clip means may be generally U-shaped and may include a pair of facing arm means extending from a closed portion of the U-shape, the pair of facing arm means being resiliently biased toward one another. The deep input guide clip means may include a plurality of dust trap means to trap dust as a document is introduced into the scanner. A plurality of document proximity sensor means may also be provided to detect a leading edge, width and trailing edge of a document introduced into the scanner, the proximity sensor means being secured within the deep input guide clip means. The proximity sensor means may be secured within the deep input guide clip means by selected ones of a plurality of retaining bend means integral to the guide clip means and by at least one proximity sensor fold means integral to the deep input guide clip means, an active portion of each of the plurality of document proximity sensor means being aligned with a corresponding one of the plurality of dust trap means. Scrapping means may also be provided to scrape the document as it is introduced into the scanner. A primary input guide means may include a generally planar first surface angled relative to a surface of the deep input guide clip means adapted to face the document; and a generally arcuate second surface facing the feed roller means in close proximity therewith and having a curvature generally matching that of the feed roller means. In this manner, the primary input guide means constrains a path of the document between the first surface and the document facing surface and prevents the feed roller means from catching the document until the document is deeply engaged within the scanner. The image sensor means may include a contact image sensor and the plurality of document proximity sensor means may include infrared sensors.

The foregoing and other features of the invention are described in detail below and set forth in the appended claims.

BRIEF DESCRIPTION OF THE DRAWINGS

For a further understanding of the objects and advantages of the present invention, reference should be made to the following detailed description, taken in conjunction with the accompanying figures, in which.

DESCRIPTION OF THE PREFERRED EMBODIMENTS

Figure 3A:
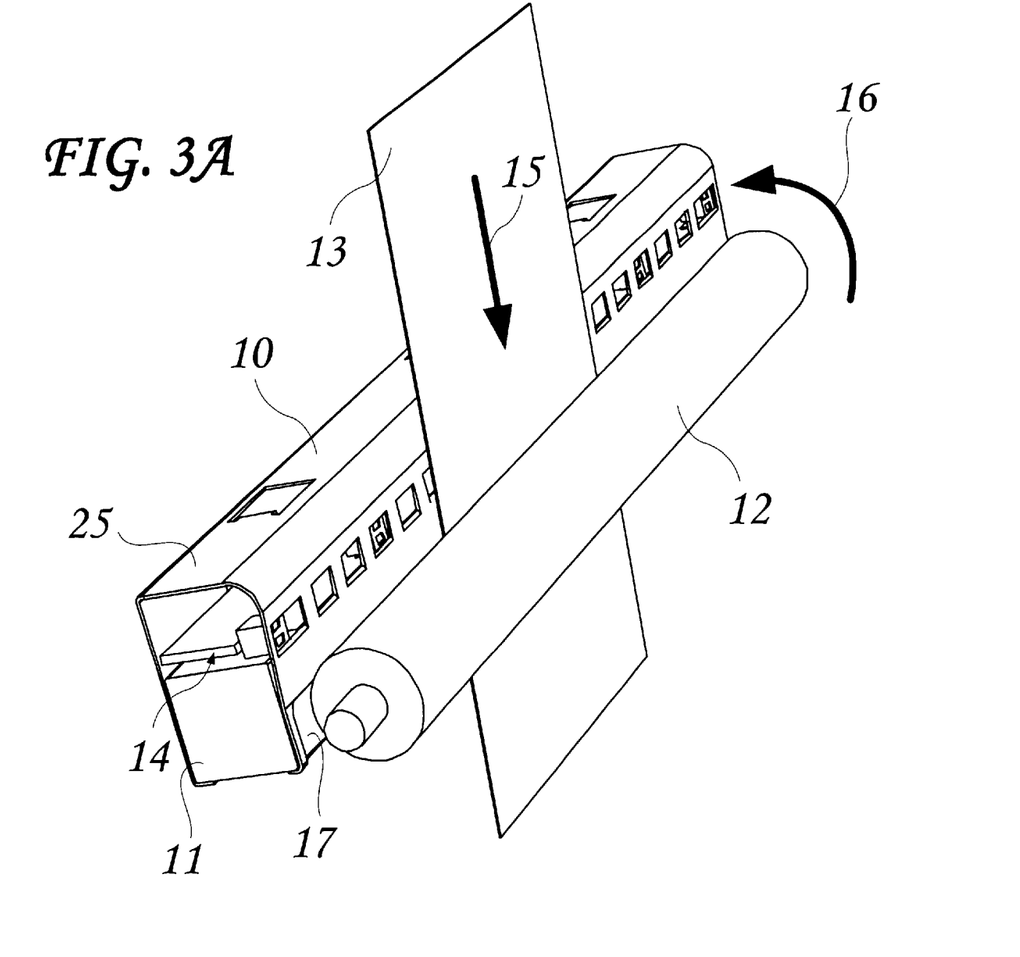
FIG. 3A is a perspective view of the major components of a sheet-fed scanner including a deep input guide clip, according to an embodiment of the present invention.
Figure 3B:
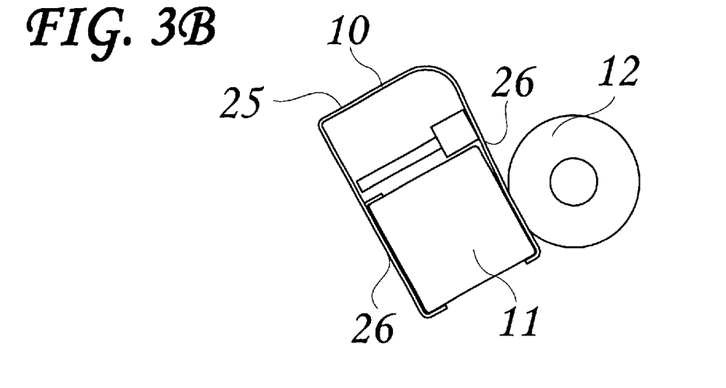
FIG. 3B is a side view of the sheet-fed scanner of FIG. 3A.

FIGS. 3A and 3B are a perspective and a side view, respectively, of a sheet-fed scanner including a deep input guide clip according to an embodiment of the present invention. The scanner frame, motor, gears, controller, power module and other associated electronic circuits are not shown, for clarity of illustration. For example, the scanner according to the present invention may advantageously be controlled by and incorporate the controller disclosed in the commonly assigned U.S. patent application Ser. No. 08/931,131 now U.S. Pat. No. 6,344,906, entitled "Universal Document Scanner Controller" filed on Sep. 16, 1997, the disclosure of which is hereby incorporated herein by reference in its entirety. Also, the scanner according to the present invention may advantageously be powered by and incorporate the power module disclosed in the commonly assigned U.S. Pat. No. 5,847,948, entitled "Scanner Power Module", the disclosure of which is hereby incorporated herein by reference in its entirety.

Figure 6:
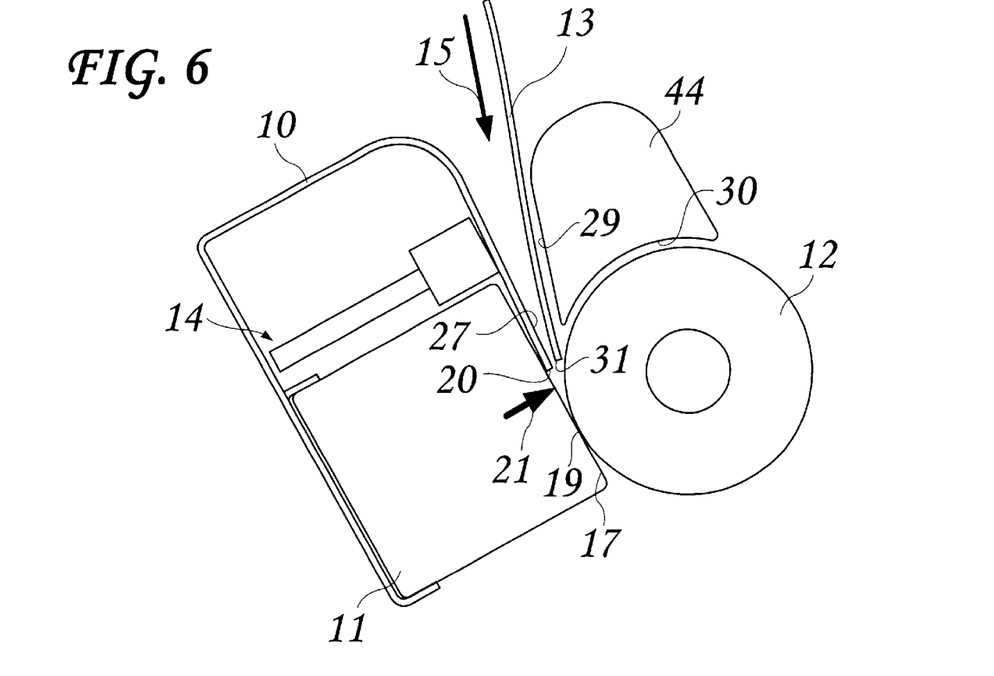
FIG. 6 is a sectional view showing a deep input guide clip according to an embodiment of the present invention, when there is no document being driven between the feed roller and the transparent surface of the image sensor.
Figure 7:
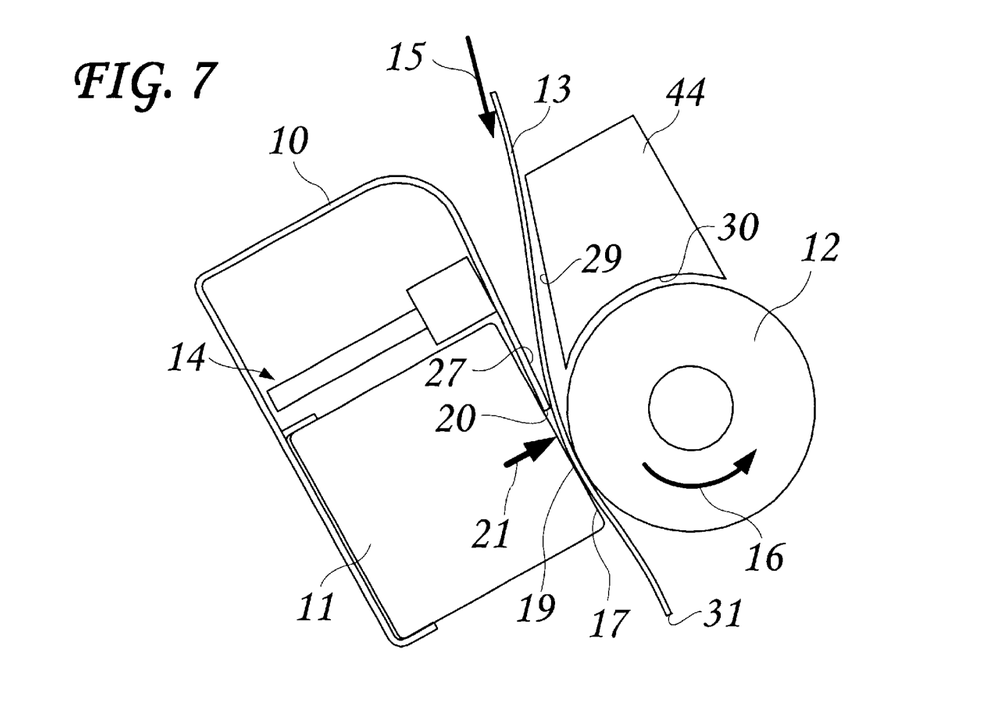
FIG. 7 is a sectional view showing a deep input guide clip according to an embodiment of the present invention, showing a document being driven between the feed roller and the contact image sensor glass.

According to an embodiment thereof, the scanner according to the present invention includes a deep input guide clip 10, an image sensor 11, a feed roller 12, a document proximity sensor assembly 14 and may include a primary input guide 44, exemplars of the latter being shown in FIGS. 6 and 7. As shown in FIGS. 3A and 3B, the deep input guide clip 10 clips onto the image sensor 11. According to an embodiment of the present invention, the image sensor 11 may be maintained in its proper position and orientation solely by the deep input guide clip 10, to which the image sensor 11 is removably clipped. In turn, the deep input guide clip 10 may be fastened to the scanner frame (not shown) to secure the assembly thereto. The rotatable feed roller 12 is coupled to a feed roller motor, an example of which is shown in FIG. 1 at reference numeral 4. In operation of the scanner according to the present invention, a document 13 (generally a paper document, although the present invention is not limited thereto) is pressed against a transparent surface 17 of the image sensor 11 by the feed roller 12. The transparent surface 17 of the image sensor 11 may be formed of glass or any other suitable (hard and scratch resistant) transparent material. The transparent surface 17 is disposed over and protects the active scanning elements (not shown) within the image sensor 1. The image sensor 11 may include, for example, a CIS. The document 13 is fed over the transparent surface 17 of the image sensor 11 in the direction of the arrow 15 when the feed roller 12 is rotated in the direction indicated by the arrow 16. The feed roller 12 may also be rotated in the direction opposite that indicated by the arrow 16, whereupon the document 13 will be ejected from the scanner in the direction opposite that indicated by arrow 15. A document proximity sensor assembly 14 (which may include, for example, infrared sensors) may be held in place inside the deep input guide clip 10. The proximity sensor assembly 14 may detect the leading edge, the width and the trailing edge of the document 13. The feed roller 12 is adapted and positioned to contact the transparent surface 17 of the image sensor at least when no document 13 is inserted into the scanner. When a document 13 is inserted into the scanner, the document 13 is advanced past the transparent surface 17 of the image sensor 11 and is gripped by the feed roller 12. The rotating feed roller 12 then advances the document 13, the leading edge, width and trailing edge of the document 13 being detected by the document proximity sensor assembly 14. When the document 13 is advanced past the image sensor 11, at least a portion of the feed roller is no longer in contact with the transparent surface 17, being in contact with the document 13 instead over at least a portion of its length.

As shown in FIGS. 3A and 3B, the deep input guide clip 10 has a generally U-shape, formed by a closed portion 25 from which extend a pair of facing arms 26 to at least partially encircle the image sensor 11. To help secure the image sensor 11 between the two facing arms 26 of the deep input guide clip 10, the pair of facing arms 26, according to an embodiment of the present invention, may be resiliently biased toward one another, as best shown in FIG. 3B, wherein it can be seen that the arm 26 closest to the feed roller 12 is not parallel to the adjacent surface of the image sensor 11. The deep input guide clip 10 may be shaped from a single sheet of material, such as for example, sheet metal or plastic. Alternatively other suitably stiff and resilient materials may be employed. Shaping the deep input guide clip 10 from a single, substantially homogeneous sheet of material reduces the manufacturing steps required to produce the part and thus decreases manufacturing costs, thereby reducing the overall cost of the assembled scanner unit.

Figure 4:
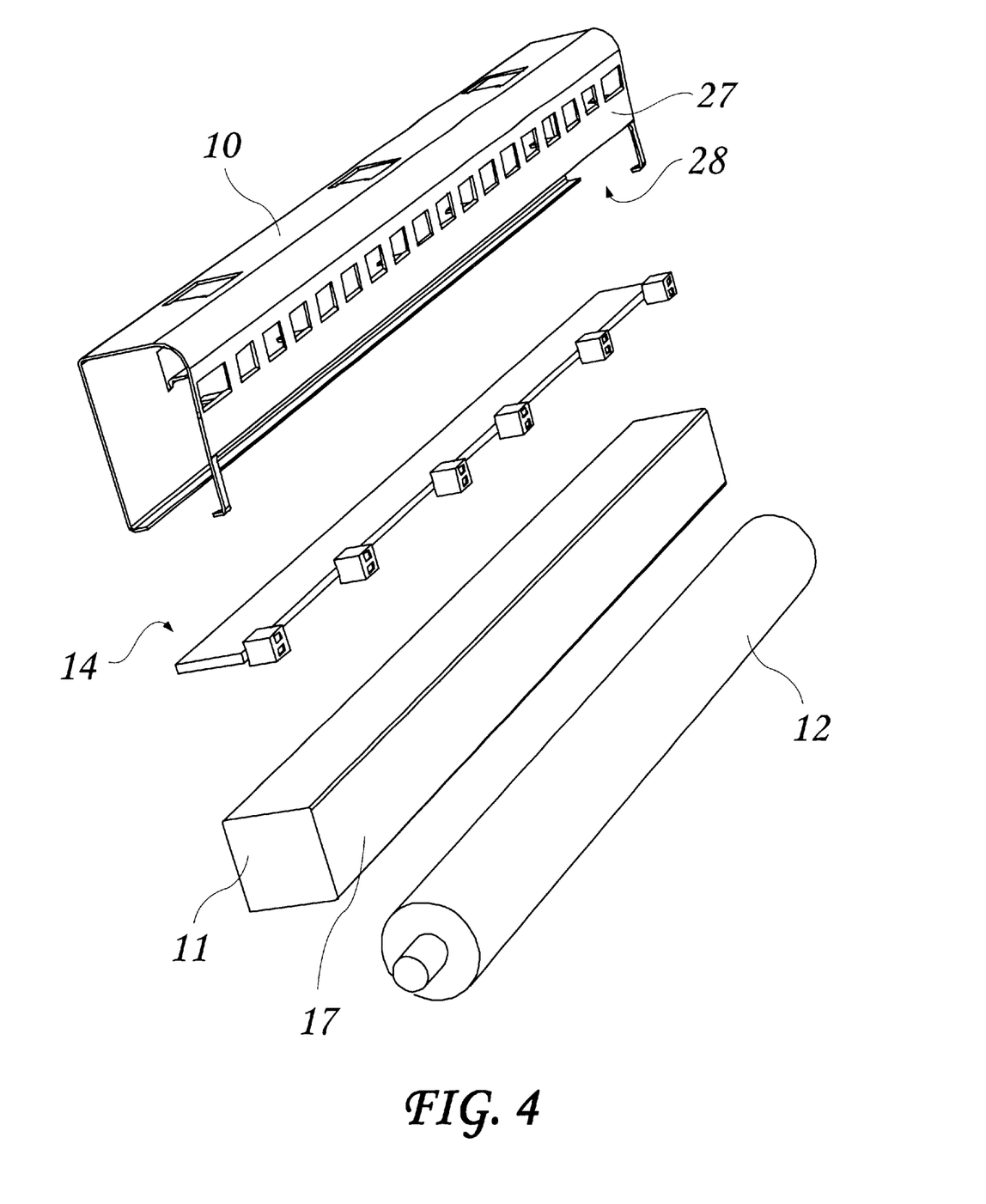
FIG. 4 is an exploded view of a sheet-fed document scanner including a deep input guide clip according to an embodiment of the present invention.
Figure 5:
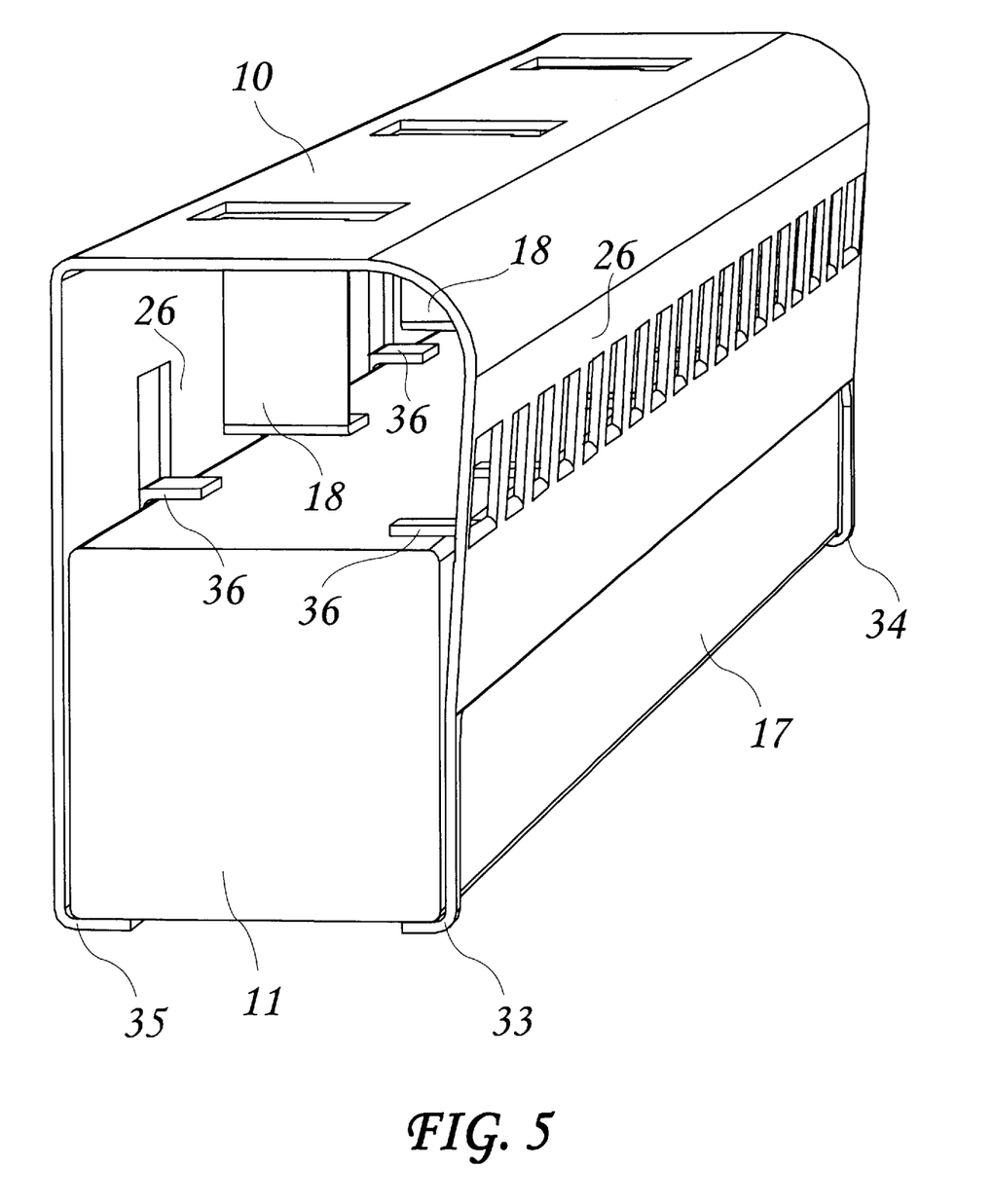
FIG. 5 is a perspective view of a deep input guide clipped onto an image sensor (e.g., CIS), according to an embodiment of the present invention.

FIG. 4 shows the constituent elements of the scanner represented in FIGS. 3A and 3B in an exploded view for easier identification. As shown therein, the deep input guide clip 10 includes a document facing surface 27 that defines an opening 28 (also shown in FIGS. 8 and 9) that is aligned (see FIG. 3A) with the transparent surface 17 of the image sensor 11. FIG. 5 shows how the deep input guide clip 10 is clipped around and to the image sensor 11. The deep input guide clip 10 is precisely maintained in position around the image sensor 11 by a plurality of retaining bends, exemplars thereof being shown at reference numerals 33, 34, 35 and 36. The deep input guide clip 10 includes other similar retaining bends that are not visible in the figures. According to an embodiment of the present invention, the retaining bends 36 are integrally formed in a one-piece deep input guide clip 10. Indeed, the retaining bends 36 according to the present invention may be formed, for example, by cutting out three sides of a rectangular window from the facing arms 26 and pushing in the partially cut out portion toward the facing arm 26. Likewise, the retaining bends 33, 35 may be integrally formed in the one-piece deep input guide clip 10 and may be formed by bending the free extremities of the arms 26 toward each other to form bracket-shaped bends adapted to clip onto and support the image sensor 11. The document proximity sensor assembly 14 may be clipped and secured into the deep input guide clip 10 by a combination of a plurality of proximity sensor folds 18 and one or more of the retaining bends 36. The proximity sensor folds 18 may be formed in a manner similar to the retaining bends 36; i.e., by cutting out three sides of a rectangular window from the closed portion 25 of the generally U-shaped deep input guide clip 10 and pushing in the partially cut out portion inward (between the facing arms 26). The retaining bends 33, 34, 35, 36 and the proximity sensor folds 18 may be shaped differently than illustrated in the figures and formed by methods other than described herein without, however, departing from the scope of the present invention.

FIG. 6 is a sectional view showing the deep input guide clip 10 clipped on the image sensor 11 when there is no document 13 being driven between the feed roller 12 and the transparent surface 17 of the image sensor 11. A document 13 is shown in FIG. 6, albeit not inserted between the transparent surface 17 and the feed roller 12. In this configuration, the feed roller 12 may be directly in contact with the transparent surface 17 of the image sensor 11 at the point of contact indicated at 19. It is to be understood that the point of contact 19, over the length of the feed roller 12, forms a corresponding line of contact. According to an embodiment of the present invention, the primary input guide 44 includes a generally planar first surface 29 angled relative to the document facing surface 27 of the deep input guide clip 10. The primary input guide 44 may also include a generally arcuate second surface 30 facing the feed roller 12 in close proximity therewith and having a curvature generally matching that of the outermost surface (the surface adapted to contact the transparent surface 17) of the feed roller 12. According to the present invention, the primary input guide 44 covers much of the outermost surface the feed roller 12 such that the leading edge 31 of the document 13 cannot contact the (e.g., rubber) outermost surface of the feed roller 12. In this manner, the leading edge 31 of the document 13 may be guided such as to penetrate as deeply as possible between the document facing surface 27 of the deep input guide clip 10 and the feed roller 12 before the feed roller 12 is rotated in response to a signal from the document proximity sensor assembly 14. That is, the primary input guide clip 10 constrains the path of the document 13 between the first surface 29 and the document facing surface 27 of the input guide clip 10 and prevents the feed roller 12 from catching the document 13 until it is deeply engaged within the scanner.

When a document 13 is inserted in the direction 15, its leading edge 31 is gently pushed over the deep input guide edge 20. As soon as the constituent sensors (shown in FIG. 10) of the document proximity sensor assembly 14 detect the entry of a document 13, the electronics circuits driving the image sensor 11 begin monitoring the video signal that is generated from the line of pixels that is sensed at an optical focus line located at the point indicated by the arrow 21. The optical focus line 21 is the line at which the active elements of the image sensor 11 sense the light (through the transparent surface 17) reflected from the document 13. According to the present invention, the optical focus line 21 is slightly offset from the line of contact 19 of the feed roller 12 with the transparent surface 17 and/or the document 13. When there is no document 13 passing over the optical focus line, the feed roller 12 (e.g., the black rubber outermost surface thereof) is detected. When the document leading edge 31 passes over the optical focus line 21, the document 13. (most often of a lighter color than the outermost surface of the feed roller, such as white) is detected by the image sensor 11 and the feed roller 12 may be immediately rotated as soon as a uniform document edge 31 corresponding to the document width derived by the constituent proximity sensors 24 (see FIG. 10) of the document proximity sensor assembly 14 is detected at the optical focus line 21. Associated anti-skew auto-start systems (not shown) may ensure that the document 13 is perfectly aligned before the scanner document feed is enabled. When the document 13 is properly aligned, the feed roller 12 may be automatically activated to initiate a scanning operation, thus ensuring that the resulting scanned image is always free of skew. Advantageously, the scanner according to the present invention may incorporate the anti-skew auto-start system disclosed in the commonly assigned U.S. patent application Ser. No. 08/904,337, entitled "Anti-Skew Auto-Start System For Document Scanners" filed on Jul. 31, 1997, the disclosure of which is incorporated herein by reference in its entirety.

FIG. 7 is a sectional view showing the deep input guide clip 10 clipped on the image sensor 11 when a document 13 is driven between the feed roller 12 and the transparent surface 17 of the image sensor 11. The contact line 19 is the tangent to the transparent surface 17 of the image sensor 11 and the outermost surface of the feed roller 12. According to the present invention, maximum pressure is exercised by the feed roller 12 onto the document 13/transparent surface 17 along the contact line indicated at 19. It follows that abrasive impurities on or within the document 13 will have a tendency to scratch the transparent surface 17 (e.g. glass) of the image sensor 11 along the contact line 19, the line at which maximum pressure is exerted. Therefore, maximum soiling of the transparent surface 17 of the image sensor may occur at and/or around this contact line 19 of maximum feed roller pressure.

The edge 20 of the deep input guide clip 10 keeps the document 13 from making close contact with the transparent surface 17 in the area of the transparent surface 17 between the contact line 19 and the edge 20 of the document facing surface 27. In this area, the pressure of the document 13 against the transparent surface 17 is less than at the contact line 19 and may be almost null. Indeed, the pressure on the document 13 during a scanning operation is, according to the present invention, greater at the contact line 19 than at the optical focus line 21 of the image sensor 11. Therefore, scratching of the transparent surface 17 thereof due to document impurities and soiling by non-dry oily ink may be reduced or avoided altogether. To further prevent soiling of the transparent surface 17 at and/or around the focus line 21 of the image sensor 11, the edge 20 of the document facing surface 27 of the deep input guide clip 10 may be sharp, to thereby act as a scrapper to remove or flatten ink buildups and/or other protruding impurities. Therefore, the transparent surface 17 over the active sensing elements of the image sensor 11 at and/or around the optical focus line 21 will tend to remain clean and unscratched, and the scanner will not require frequent cleaning to maintain the quality of the resulting scanned images. The deep input guide clip 10 according to the present invention has the added benefit of stopping parasitic ambient light and protecting the image sensor against hard falling objects, thus avoiding breakage of the transparent surface 17.

Figure 8:
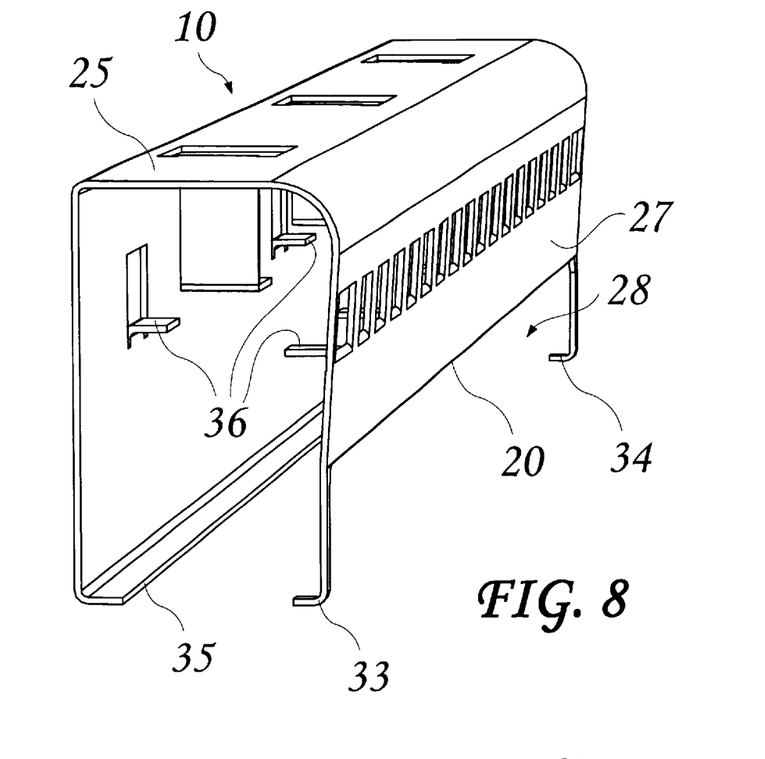
FIG. 8 is a detailed perspective view of a deep input guide clip for document scanners, according to an embodiment of the present invention.

FIG. 8 shows a detailed perspective view of the deep input guide clip 10. The deep input guide clip 10 may be advantageously produced from a single piece of precision sheet metal. The retaining bends 33, 34, 35 and 36 are clearly visible. The location of the retaining bends 33, 34, 35 and 36 (and other similar retaining bends not visible in the perspective drawings) are precisely determined so as to precisely locate the optical focus line 21 (See FIGS. 6 and 7) relative to the contact line 19 of the feed roller 12 against the document 13 and/or the transparent surface 17 of the deep input guide clip 10. According to an embodiment of the present invention, the retaining bend 35 may be formed as a continuous rail along one of the facing arms 26, thereby lending rigidity to the deep input guide clip 10. Retaining bends 33, 34, 35 and/or 36 having shapes other than illustrated may also be employed. As shown in FIG. 8, the retaining bends 33, 34 formed from the document facing surface 27 of the deep input guide clip 10 may be shaped as slender extensions bent at their extremities to clip onto the image sensor 11 (not shown in FIG. 8) and to provide the opening 28 through which the transparent surface 17 of the image sensor 11 may appear.

Figure 9:
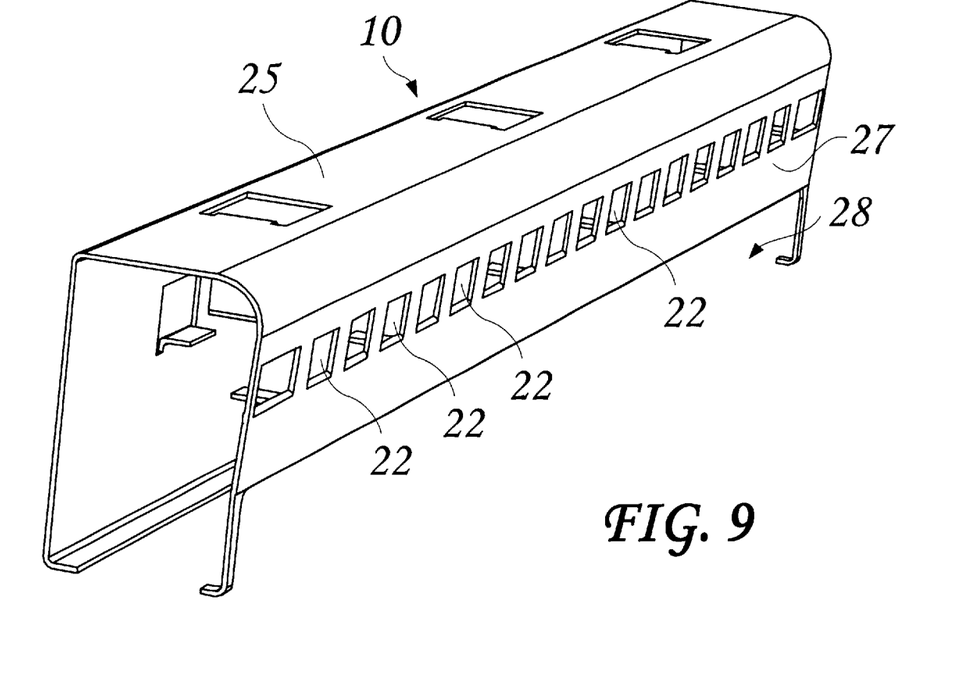
FIG. 9 shows the deep input guide clip of FIG. 8, further rotated to clearly show the plurality of dust trap cutouts.

FIG. 9 is a view of the deep input guide clip oriented such as to clearly show an embodiment of the present invention wherein the document facing surface 27 defines a plurality of spaced cutouts 22 adapted to trap dust as the document 13 (not shown in FIG. 9) is introduced into the scanner. Some or all of these cutouts 22 may also form retaining bends, such as shown at 36 in FIG. 8, to precisely located the image sensor 11 and/or the document proximity sensor assembly 14 therein. The cutouts 22 may, as shown in FIG. 9, be regularly spaced along the document facing surface 27 of the deep input guide clip 10.

Figure 10:
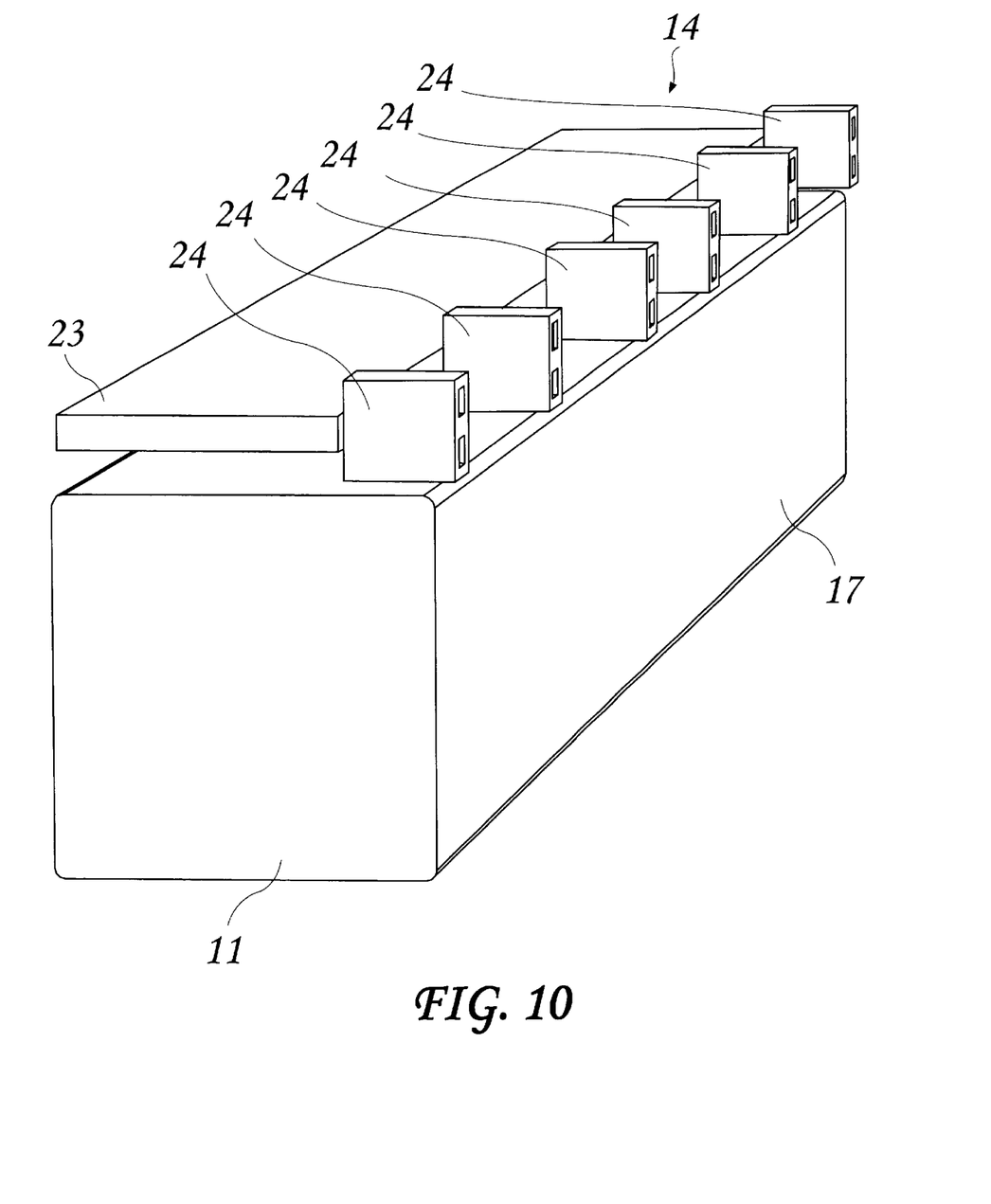
FIG. 10 shows the document proximity sensor assembly with a plurality of infrared proximity sensors and their relative position with the image sensor and the transparent surface of the image sensor.

FIG. 10 shows the document proximity sensors assembly 14 with six constituent proximity sensors 24 (other numbers of sensors may also be employed), and their relative position with the contact image sensor 11 and the transparent surface 17. The proximity sensors 24 may include, for example, infrared sensors. The sensors 24 and their associated circuit board 23 may be precisely held in place in the deep input guide clip 10 by the retaining bends 36 and/or the proximity sensor folds 18 (FIG. 5). The proximity sensors 24 may be secured, according to the present invention, within the deep input guide clip 10 by selected ones of the retaining bends 36 and/or proximity sensor folds 18 integral to the deep input guide clip 10. The active portion of each of the plurality of document proximity sensors 24 may be aligned with a corresponding one of the plurality of spaced cutouts 22.

While the foregoing detailed description has described preferred embodiments of the present invention, it is to be understood that the above description is illustrative only and not limiting of the disclosed invention. For example, the shape and position of the retaining bends 33, 34, 36 of the deep input guide clip 10 may differ from that described and illustrated herein. Still other modifications may occur to those of skill in this art. Thus, the present invention to be limited only by the claims as set forth below.

What is claimed is:

1. A document scanner, comprising:
   an image sensor, the image sensor including a transparent surface over an optical focus line;
   a feed roller motor;
   a rotatable feed roller coupled to the feed roller motor, the feed roller being adapted to contact said transparent surface along a contact line that is offset from said optical focus line; and
   a generally U-shaped deep input guide clip, the deep input guide clip including a plurality of retaining bends to clip onto the image sensor and including a document facing surface defining an opening aligned with the transparent surface, the retaining bends precisely locating the optical focus line relative to the contact line.

2. The document scanner of claim 1, wherein the deep input guide clip is shaped from a single sheet of material.

3. The document scanner of claim 2, wherein the material is one of plastic and sheet metal.

4. The document scanner of claim 1, wherein the generally U-shaped deep input guide clip includes a pair of facing arms extending from a closed portion of the U-shape, the pair of facing arms being resiliently biased toward one another.

5. The document scanner of claim 1, wherein the deep input guide clip includes plurality of spaced cutouts adapted to trap dust as a document is introduced into the scanner.

6. The document scanner of claim 5, further comprising a plurality of document proximity sensors to detect a leading edge, width and trailing edge of the document introduced into the scanner, the proximity sensors being secured within the deep input guide clip.

7. The document scanner of claim 6, wherein the proximity sensors are secured within the deep input guide clip by selected ones of the retaining bends and by proximity sensor folds integral to the deep input guide clip, an active portion of each of the plurality of document proximity sensors being aligned with a corresponding one of the plurality of spaced cutouts.

8. The document scanner of claim 1, wherein an edge of the document facing surface is disposed so as to scrape the document as it is introduced into the scanner.

9. The document scanner of claim 1, wherein the optical focus line is disposed between the edge of the document facing surface and the contact line, a pressure on the document during a scanning operation being greater at the contact line than at the optical focus line.

10. The document scanner of claim 1, further comprising a primary input guide including:
   a generally planar first surface angled relative to the document facing surface; and
   a generally arcuate second surface facing the feed roller in close proximity therewith and having a curvature generally matching that of the feed roller,
   whereby the primary input guide constrains a path of the document between the first surface and the document facing surface and prevents the feed roller from catching the document until the document is deeply engaged within the scanner.

11. The document scanner of claim 1, wherein the image sensor includes a contact image sensor.

12. The document scanner of claim 1, wherein the plurality of document proximity sensors include infrared sensors.

13. A one-piece deep input guide clip to secure an image sensor of a document scanner, the guide clip including a closed portion from which a pair of facing arms extend, the facing arms being resiliently biased toward one another and including a plurality of retaining bends to clip onto and precisely locate at least an image sensor between the pair of facing arms, the guide clip further including a document facing surface, the document facing surface defining a plurality of cutouts adapted to trap dust and to provide openings for document proximity sensors.

14. The one-piece deep input guide clip of claim 13, wherein the document facing surface further defines a transparent surface opening to accommodate a transparent surface of the image sensor.

15. The one-piece deep input guide clip of claim 13, wherein the deep input guide clip is formed of one of plastic and sheet metal.

16. The one-piece deep input guide clip of claim 13, wherein the closed portion defines at least one proximity sensor fold extending between the facing arms to secure, in combination with at least one of the plurality of retaining bends, a document proximity sensor assembly.

17. The one-piece deep input guide clip of claim 13, wherein each of the plurality of retaining bends is formed by cutting out three sides of a rectangular window in one arm of the pair of facing arms and pushing a remaining portion of the window toward the other arm of the pair of facing arms.

18. The one-piece deep input guide clip of claim 13, wherein a first retaining bend of the plurality of retaining bends is located at a free extremity of one of the facing arms and forms a continuous rail along a width thereof, the rail being adapted to clip onto the image sensor.

19. The one-piece deep input guide clip of claim 13, wherein at least one second retaining bend of the plurality of retaining bends is shaped as a slender extension bent at a free extremity thereof to clip onto the image sensor.

20. A document scanner, comprising:
   image sensing means, the image sensing means including a transparent surface over an optical focus line;
   feed roller motor means;
   a rotatable roller means coupled to the feed roller motor means, the feed roller means being adapted to contact said transparent surface along a contact line that is offset from said optical focus line; and
   deep input guide clip means, the deep input guide clip means being generally U-shaped and including a pair of facing arm means extending from a closed portion of the U-shape, the pair of facing arm means being resiliently biased toward one another, the deep input guide clip means including means for precisely locating the optical focus line relative to the contact line such that a pressure on a document during a scanning operation is greater at the contact line than at the optical focus line.

21. The document scanner of claim 20, wherein the pressure on the document at the optical focus line is substantially null.

22. The document scanner of claim 20, wherein the deep input guide clip means includes a plurality of integral retaining bend means to clip onto the image sensor means, and includes a document facing surface defining an opening aligned with the transparent surface, the integral retaining bend means precisely locating the optical focus line relative to the contact line.

23. The document scanner of claim 20, wherein the deep input guide clip means is shaped from a single sheet of material.

24. The document scanner of claim 23, wherein the material is one of plastic and sheet metal.

25. The document scanner of claim 20, wherein the deep input guide clip means includes a plurality of dust trap means to trap dust as a document is introduced into the scanner.

26. The document scanner of claim 25, further comprising a plurality of document proximity sensor means to detect a leading edge, width and trailing edge of a document introduced into the scanner, the proximity sensor means being secured within the deep input guide clip means.

27. The document scanner of claim 26, wherein the proximity sensor means are secured within the deep input guide clip means by selected ones of a plurality of retaining bend means integral to the guide clip means and by at least one proximity sensor fold means integral to the deep input guide clip means, an active portion of each of the plurality of document proximity sensor means being aligned with a corresponding one of the plurality of dust trap means.

28. The document scanner of claim 20, further including scrapping means to scrape the document as it is introduced into the scanner.

29. The document scanner of claim 20, further comprising a primary input guide means including:
   a generally planar first surface angled relative to a surface of the deep input guide clip means adapted to face the document; and
   a generally arcuate second surface facing the feed roller means in close proximity therewith and having a curvature generally matching that of the feed roller means,
   whereby the primary input guide means constrains a path of the document between the first surface and the document facing surface and prevents the feed roller means from catching the document until the document is deeply engaged within the scanner.

30. The document scanner of claim 20, wherein the image sensor means includes a contact image sensor.

31. The document scanner of claim 26, wherein the plurality of document proximity sensor means include infrared sensors.

32. A document scanner, comprising:
   image sensing means, the image sensing means including a transparent surface over an optical focus line;
   feed roller motor means;
   a rotatable roller means coupled to the feed roller motor means, the feed roller means being adapted to contact said transparent surface along a contact line that is offset from said optical focus line; and deep input guide clip means including a plurality of integral retaining bend means to clip onto the image sensor means for precisely locating the optical focus line relative to the contact line such that a pressure on a document during a scanning operation is greater at the contact line than at the optical focus line, the deep input guide clip means including a document facing surface defining an opening aligned with the transparent surface.

33. A document scanner, comprising:

image sensing means, the image sensing means including a transparent surface over an optical focus line;

feed roller motor means;

a rotatable roller means coupled to the feed roller motor means, the feed roller means being adapted to contact said transparent surface along a contact line that is offset from said optical focus line; and deep input guide clip means, the deep input guide clip means including:
 means for precisely locating the optical focus line relative to the contact line such that a pressure on a document during a scanning operation is greater at the contact line than at the optical focus line;
 a plurality of dust trap means to trap dust as a document is introduced into the scanner;

a plurality of document proximity sensor means to detect a leading edge, width and trailing edge of a document introduced into the scanner, the proximity sensor means being secured within the deep input guide clip means by selected ones of a plurality of retaining bend means integral to the guide clip means and by at least one proximity sensor fold means integral to the deep input guide clip means, an active portion of each of the plurality of document proximity sensor means being aligned with a corresponding one of the plurality of dust trap means.

34. A document scanner, comprising:

image sensing means, the image sensing means including a transparent surface over an optical focus line;

feed roller motor means;

a rotatable roller means coupled to the feed roller motor means, the feed roller means being adapted to contact said transparent surface along a contact line that is offset from said optical focus line;

deep input guide clip means, the deep input guide clip means including means for precisely locating the optical focus line relative to the contact line such that a pressure on a document during a scanning operation is greater at the contact line than at the optical focus line, and a primary input guide means including:
 generally planar first surface angled relative to a surface of the deep input guide clip means adapted to face the document, and
 a generally arcuate second surface facing the feed roller means in close proximity therewith and having a curvature generally matching that of the feed roller means, whereby the primary input guide means constrains a path of the document between the first surface and the document facing surface and prevents the feed roller means from catching the document until the document is deeply engaged within the scanner.

* * * * *